(12) United States Patent
Hensley et al.

(10) Patent No.: US 7,523,690 B1
(45) Date of Patent: Apr. 28, 2009

(54) WELD GUN LUG RESURFACING TOOL

(75) Inventors: Michael E. Hensley, Columbia, TN (US); Blake L. Clegg, Franklin, TN (US); Douglas W. Ware, Thompson's Station, TN (US); Randy E. Daniels, Spring Hill, TN (US); Robert W. Schoch, Thompsons Station, TN (US); Randall H. Decker, Franklin, TN (US)

(73) Assignee: GM Global Technology Operations, Inc., Detroit, MI (US)

( * ) Notice: Subject to any disclaimer, the term of this patent is extended or adjusted under 35 U.S.C. 154(b) by 16 days.

(21) Appl. No.: 11/872,068

(22) Filed: Oct. 15, 2007

(51) Int. Cl.
*B23B 5/16* (2006.01)
*B23B 3/22* (2006.01)

(52) U.S. Cl. .................... 82/1.11; 82/113; 407/53; 407/54; 407/34

(58) Field of Classification Search ............ 82/1.11, 82/113; 407/30, 33, 34, 53, 54; 408/101, 408/102; 30/96; 409/131, 145
See application file for complete search history.

(56) References Cited

U.S. PATENT DOCUMENTS

| | | | | | |
|---|---|---|---|---|---|
| 2,053,644 | A | * | 9/1936 | Tuttle | .................. 82/172 |
| 3,028,152 | A | * | 4/1962 | Scholl et al. | ............... 299/41.1 |
| 3,241,268 | A | * | 3/1966 | Olson | ..................... 451/490 |
| 3,561,302 | A | * | 2/1971 | Keener | ..................... 82/1.11 |
| 4,733,995 | A | * | 3/1988 | Aebi | ........................ 407/34 |
| 4,739,682 | A | * | 4/1988 | Birkestrand | .............. 82/113 |
| 6,968,761 | B2 | * | 11/2005 | Frank | ......................... 82/113 |

\* cited by examiner

*Primary Examiner*—Willmon Fridie

(57) ABSTRACT

A resurfacing tool and method of operation for a weld gun lug having a lug face is disclosed. The resurfacing tool may comprise a hollow chip retention housing having a lug entrance, a bushing opening, and a chip retention area. A rotary attachment shaft extends through the lug entrance and rotates relative to the retention housing, driven by a rotary power tool. A cutting head assembly is mounted to the rotary attachment shaft in the retention housing for rotation with the rotary attachment shaft, with the cutting head assembly having a cutting head facing toward the lug entrance. A member defines an alignment bore oriented coaxially relative to the rotary attachment shaft. A guide pin has a lug attachment portion configured to attach to the weld gun lug normal to the cable bolt attachment hole, and a pilot shaft telescopically received in the alignment bore.

16 Claims, 3 Drawing Sheets

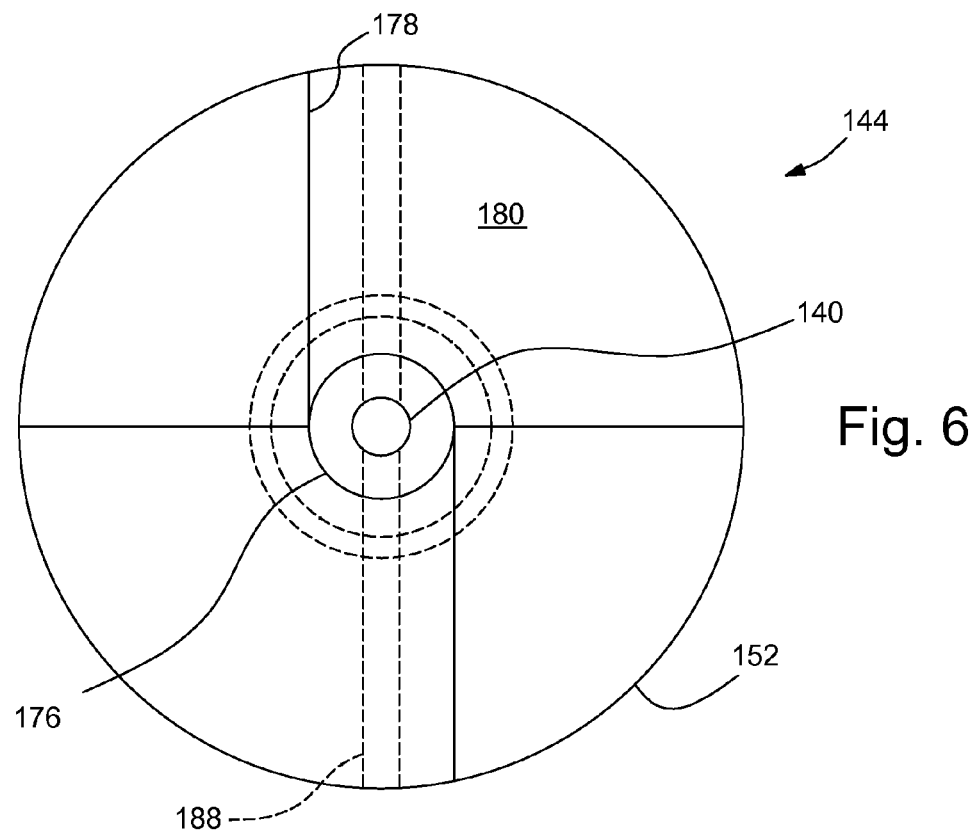
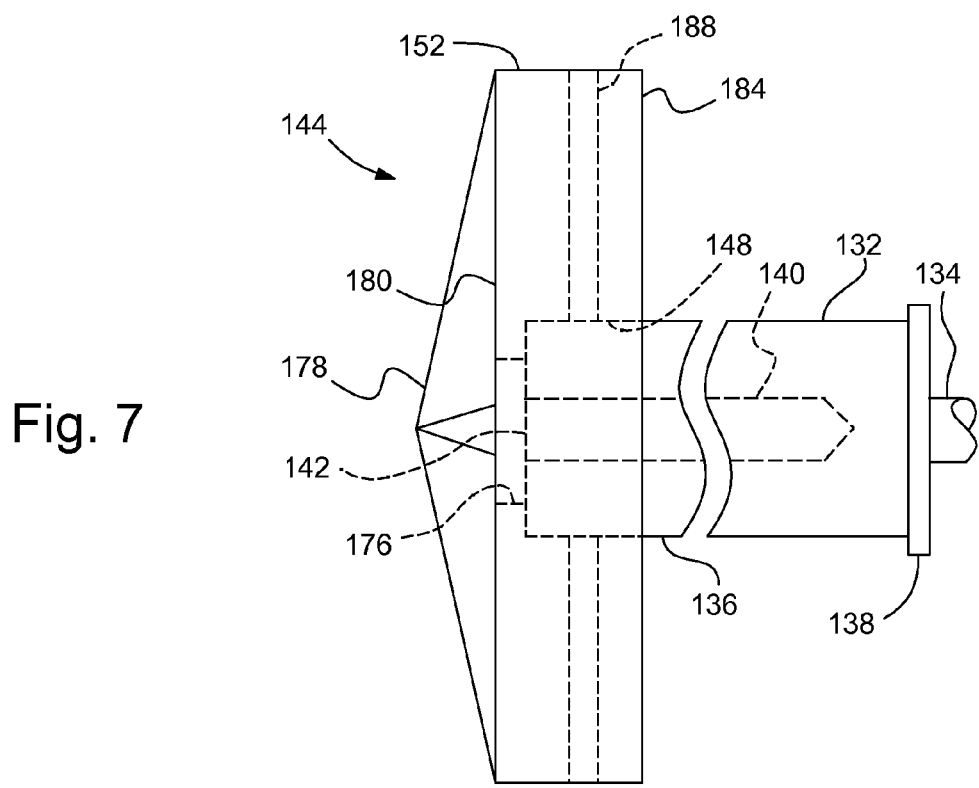

WELD GUN LUG RESURFACING TOOL

BACKGROUND OF INVENTION

The present invention relates generally to a resurfacing tool for welding equipment.

For particular welding systems, weld gun arms may include cable lugs that attached to jumper cables. The face of the lug adjacent to the jumper cable must be kept perpendicular to a cable bolt attachment hole for proper electrical alignment—that is, in order to avoid arcing during operation of the weld gun. If a jumper cable loosens-up during operation of the weld gun, the arcing that occurs at the joint between the cable lug and the jumper cable (gun arm cable) can cause the cable lug to become arced (burned).

Once damaged, the weld gun arm cable lug must be repaired or replaced. Replacement is undesirable because of the down time for disassembly and reassembly of the weld gun components, as well as the relatively high cost of the replacement gun arms. Grinding or sanding the lug face of the cable lug is undesirable because of the environmental considerations involved with dust from the copper beryllium alloy that the cable lugs are typically cast from. Providing for an environmentally-controlled area for machining the lug face has the drawbacks of having to set up an environmentally-controlled area, and also the downtime required for disassembly and reassembly of the gun in order to be able to take the cable lug to this area for processing.

SUMMARY OF INVENTION

An embodiment contemplates a resurfacing tool for a weld gun lug having a lug face and a cable bolt attachment hole extending through the face. The resurfacing tool may comprise a hollow chip retention housing having a lug entrance, a bushing opening in opposed relation to the lug entrance, and a chip retention area. A rotary attachment shaft extends through the lug entrance and can rotate relative to the retention housing, and includes a rotary tool attachment portion configured to be couple to a rotary power tool. A cutting head assembly is mounted to the rotary attachment shaft in the retention housing for rotation with the rotary attachment shaft, with the cutting head assembly having at least one cutting head facing toward the lug entrance. A member defines an alignment bore oriented coaxially relative to the rotary attachment shaft. Also, a guide pin has a lug attachment portion configured to attach to the weld gun lug normal to the cable bolt attachment hole, and a pilot shaft telescopically receivable in the alignment bore.

An embodiment contemplates a resurfacing tool for a weld gun lug having a lug face and a cable bolt attachment hole extending through the face. The resurfacing tool may comprise a hollow chip retention housing having a lug entrance, a bushing opening in opposed relation to the lug entrance, and a chip retention area. A rotary attachment shaft extends through the lug entrance and can rotate relative to the retention housing, and includes a rotary tool attachment portion configured to be coupled to a rotary power tool. A cutting head assembly is mounted to the rotary attachment shaft in the retention housing for rotation with the rotary attachment shaft, with the cutting head assembly having a cutting head facing toward the lug entrance and having a central bore coaxial with the rotary attachment shaft.

An embodiment contemplates a method of resurfacing a lug face of a cable lug on a weld gun arm, the method comprising the steps of: mounting a cutting head assembly in a hollow chip retention housing; rotationally coupling the cutting head assembly to a source of rotary power; mounting a lug attachment portion of a guide pin in a cable bolt attachment hole on the lug face such that a pilot shaft portion of the guide pin extends from the lug face; telescopically sliding the pilot shaft portion into an alignment bore in the chip retention housing that is normal to a face of the cutting head; sliding the cutting head into engagement with the lug face; and catching chips cut off the lug face by the cutting head in a chip retention area of the chip retention housing.

An advantage of an embodiment is that a quick and environmentally-friendly tool and method for resurfacing the lug face on a cable lug of weld gun arms is provided. Disassembly and reassembly of the weld gun is not required since the resurfacing tool is small enough to be used without disassembling the gun, thus minimizing downtime. Also, grinding and sanding is avoided in order to eliminate dust from the copper beryllium alloy, and the copper beryllium chips taken from the lug face are captured for proper disposal. Moreover, the cost of a new weld gun arm and downtime for disassembly and replacement is avoided. And, the resurfacing tool can be driven by a common source of rotary power, such as, for example, a common drill.

BRIEF DESCRIPTION OF DRAWINGS

FIG. 6 is a schematic, end view, on an enlarged scale, of the resurfacing tool of FIG. 4.

FIG. 7 is a schematic, elevation view, on an enlarged scale, of the resurfacing tool of FIG. 4.

DETAILED DESCRIPTION

Figure 1:
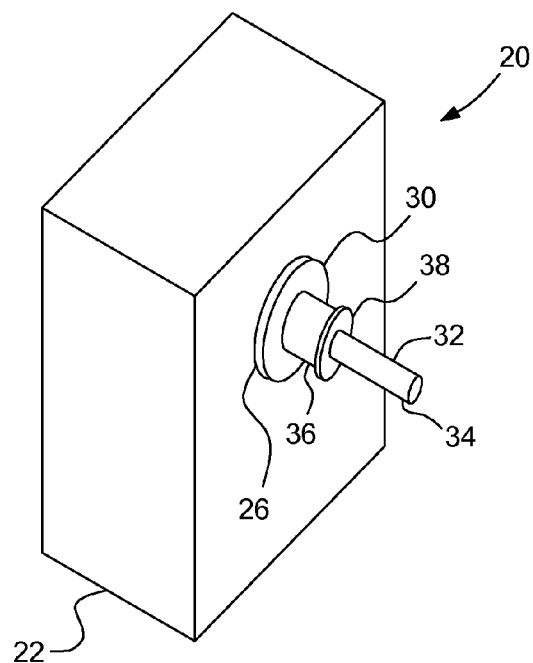
FIG. 1 is a schematic, perspective view of a resurfacing tool.
Figure 2:
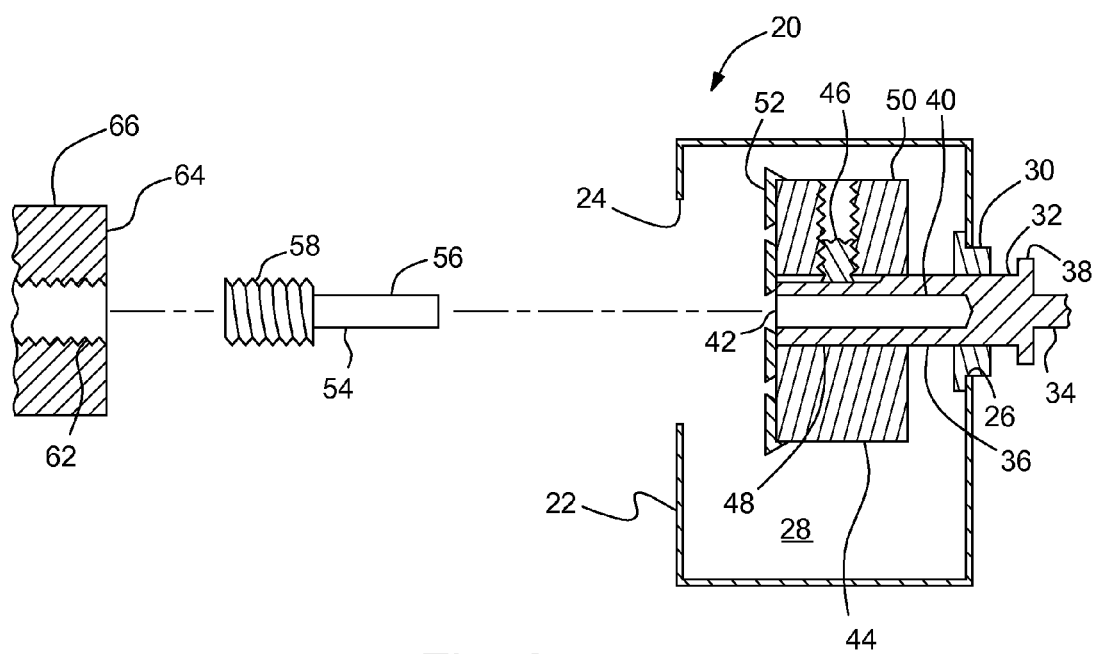
FIG. 2 is a schematic, partial cross section, elevation view of the resurfacing tool and a portion of a cable lug for a weld gun arm.

FIGS. 1-2 illustrate a resurfacing tool, indicated generally at 20. The resurfacing tool 20 includes a hollow chip retention housing 22 having a lug entrance 24, a bushing opening 26 and a chip retention area 28. A bushing 30 is mounted in the bushing opening 26 and receives and supports a rotary tool attachment shaft 32 for rotary motion.

The rotary attachment shaft 32 includes a rotary tool attachment portion 34 that is sized to be readily connected to a source of rotary power, such as, for example, a handheld drill (not shown). A telescoping portion 36 extends from the attachment portion 34 and extends through the bushing 30 into the housing 22. The telescoping portion 36 can both slide axially and rotate relative to the bushing 30. A travel limit flange 38 extends radially outward between the attachment portion 34 and the telescoping portion 36 to limit the extent of travel of the rotary attachment shaft 32 into the housing 22. An alignment bore 40 extends axially into the telescoping portion 36, forming an open end 42 of the rotary attachment shaft 32.

A cutting head assembly 44 includes a central bore 48 through a main body 50, which mounts around the telescoping portion 36. The cutting head assembly 44 may be secured to the telescoping portion 36 by a setscrew 46 engaging an outer surface of the telescoping portion 36. The cutting head assembly 44 includes a plurality of cutting heads 52 mounted to the main body 50, spaced radially outward from the central bore 48. The cutting heads 52 are aligned with and face toward the lug entrance 24. The cutting heads 52 may be carbide, if so desired.

A guide pin 54 includes a pilot shaft 56 that is sized to just fit inside and slide into the alignment bore 40. The guide pin 54 also includes a threaded lug attachment 58 that is sized to thread into a cable bolt attachment hole 62 on a lug face 64 of a cable lug 66.

Figure 3:
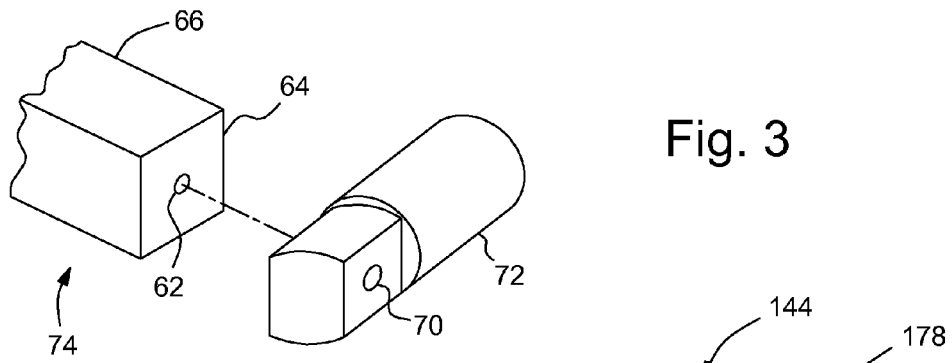
FIG. 3 is a schematic, partially exploded, perspective view of a cable lug of a weld gun arm and a jumper cable after resurfacing a lug face with the resurfacing tool.
Figure 4:
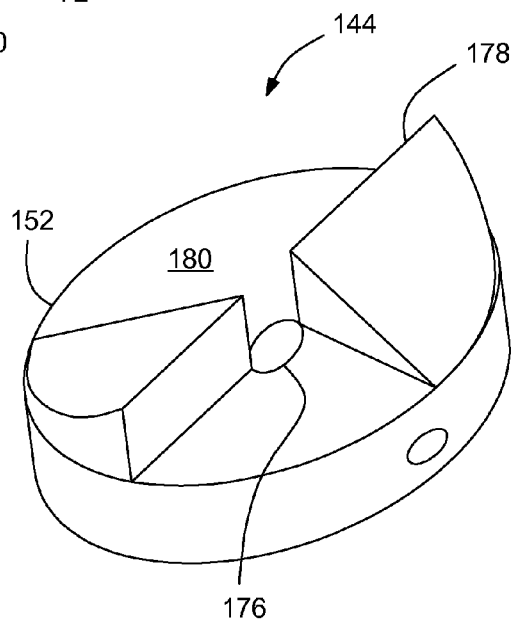
FIG. 4 is a schematic, perspective view of a portion of a resurfacing tool according to a second embodiment.
Figure 5:
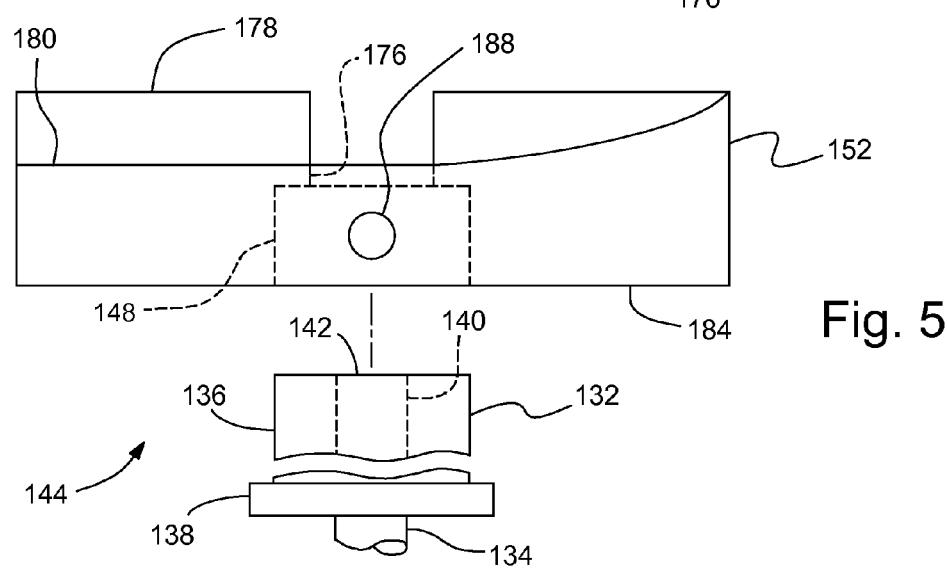
FIG. 5 is a schematic, partially exploded, perspective view, on an enlarged scale, of the resurfacing tool of FIG. 4.

The operation of the resurfacing tool 20 will now be discussed with reference to FIGS. 1-3. After it is determined that the lug face 64 may be arced, a cable bolt (not shown) extending through an attachment hole 70 in a jumper cable 72 is unscrewed from the cable bolt attachment hole 62 in the cable lug 66. The threaded lug attachment 58 is screwed into the cable bolt attachment hole 62 so that the pilot shaft 56 is exposed outside of the lug 66. The rotary tool attachment portion 34 is secured to a rotary tool, such as a handheld drill (not shown).

The lug entrance 24 of the chip retention housing 22 is moved toward the lug face 64. The pilot shaft 56 is aligned with the alignment bore 40 and slid slightly into it, such that the cutting heads 52 are close to the lug face 64. The rotary attachment shaft 32 is rotated by the rotary tool and the cutting heads 52 are brought into contact with the lug face 64. With the guide pin 54 mounted in both the cable bolt attachment hole 62 and the alignment bore 40, the cutting heads 52 will cut the lug face 64 perpendicular to the cable bolt attachment hole 62. Thus, the lug face to cable bolt attachment hole orientation needed to assure proper assembly to the jumper cable is assured. The guide pin 54 is removed from the attachment hole 62. The jumper cable 72 can then be reassembled to the cable lug 66, and the welding operation resumed—without the need to disassemble or reassemble the weld gun arm 74.

The bushing 30 allows the rotary attachment shaft 32 to rotate while maintaining the chip retention housing 22 in the desired orientation. The desired orientation is with the chip retention area 28 located below the cutting heads 52 so that the chips cut from the lug face 64 will fall into the chip retention area 28. Then, after the re-facing operation is complete, the chips, which may contain a copper beryllium alloy, can be properly disposed of.

FIGS. 4-7 illustrate a second embodiment. Since this embodiment is similar to the first, similar element numbers will be used for similar elements, but employing 100-series numbers. In this embodiment, the cutting head assembly is changed, but the chip retention housing, bushing, and guide pin may be the same as in the first embodiment, and so are not shown in this embodiment.

The cutting head assembly 144 now includes a single cutting head 152 concentrically located around a central bore 176 extending through the cutting head 152. Cutting teeth 178 extend from a front face 180 of the cutting head 152 for engagement with the lug face. The cutting head 152 includes a central bore 148 extending inward from a back face 184. A rotary attachment shaft 132 includes a telescoping portion 136 that mounts in the central bore 148 and may be secured with a pair of set screws (not shown in this embodiment) threaded into a pair of set screw bores 188. The rotary attachment shaft 132 again includes a rotary tool attachment portion 134 that is readily connected to a source of rotary power, and a travel limit flange 138. An alignment bore 140 extends axially into the telescoping portion 136, forming an open end 142 of the rotary attachment shaft 132. The process used to re-face the lug face may be the same as in the first embodiment.

While certain embodiments of the present invention have been described in detail, those familiar with the art to which this invention relates will recognize various alternative designs and embodiments for practicing the invention as defined by the following claims.

What is claimed is:

1. A resurfacing tool for a weld gun lug having a lug face and a cable bolt attachment hole extending through the face, the resurfacing tool comprising:
    a hollow chip retention housing having a lug entrance, a bushing opening in opposed relation to the lug entrance, and a chip retention area;
    a rotary attachment shaft, extending through the lug entrance and being rotatable relative to the retention housing, including a rotary tool attachment portion configured to be coupled to a rotary power tool;
    a cutting head assembly mounted to the rotary attachment shaft in the retention housing for rotation with the rotary attachment shaft, the cutting head assembly having at least one cutting head facing toward the lug entrance;
    a member defining an alignment bore oriented coaxially relative to the rotary attachment shaft; and
    a guide pin having a lug attachment portion configured to attach to the weld gun lug normal to the cable bolt attachment hole, and a pilot shaft telescopically receivable in the alignment bore.

2. The resurfacing tool of claim 1 wherein the member defining the alignment bore is a telescoping portion of the rotary attachment shaft.

3. The resurfacing tool of claim 2 wherein the cutting head assembly includes a main body mounted on the telescoping portion, and the at least one cutting head is a plurality of cutting heads mounted on the main body having cutting faces oriented normal to the alignment bore.

4. The resurfacing tool of claim 1 wherein the bushing opening has a bushing mounted therein, and the rotary attachment shaft extends through the bushing and is rotatable and axially slidable relative thereto.

5. The resurfacing tool of claim 4 wherein the rotary attachment shaft includes a travel limit flange to limit the axial sliding of the rotary attachment shaft to thereby maintain the at least one cutting head inside the retention housing.

6. The resurfacing tool of claim 1 wherein the at least one cutting head is a single cutting head having a central bore coaxial with the alignment bore.

7. The resurfacing tool of claim 6 wherein the single cutting head is carbide.

8. The resurfacing tool of claim 1 wherein the lug attachment portion includes threads configured to threadably insert into the cable bolt attachment hole.

9. A resurfacing tool for a weld gun lug having a lug face and a cable bolt attachment hole extending through the face, the resurfacing tool comprising:
    a hollow chip retention housing having a lug entrance, a bushing opening in opposed relation to the lug entrance, and a chip retention area;
    a rotary attachment shaft, extending through the lug entrance and being rotatable relative to the retention housing, including a rotary tool attachment portion configured to be coupled to a rotary power tool; and
    a cutting head assembly mounted to the rotary attachment shaft in the retention housing above the chip retention area for rotation with the rotary attachment shaft, the cutting head assembly having a cutting head facing toward the lug entrance and having a central bore coaxial with the rotary attachment shaft.

10. The resurfacing tool of claim 9 including a member, located in the chip retention housing, defining an alignment bore oriented coaxially relative to the rotary attachment shaft; and the resurfacing tool includes a guide pin having a lug attachment portion configured to attach to the weld gun lug normal to the cable bolt attachment hole and a pilot shaft telescopically receivable in the alignment bore.

11. The resurfacing tool of claim 10 wherein the lug attachment portion includes threads configured to threadably insert into the cable bolt attachment hole.

12. The resurfacing tool of claim 9 wherein the rotary attachment shaft includes a travel limit flange to limit the axial sliding of the rotary attachment shaft to thereby maintain the cutting head assembly inside the retention housing.

13. A method of resurfacing a lug face of a cable lug on a weld gun arm, the method comprising the steps of:
   (a) mounting a cutting head assembly in a hollow chip retention housing;
   (b) rotationally coupling the cutting head assembly to a source of rotary power;
   (c) mounting a lug attachment portion of a guide pin in a cable bolt attachment hole on the lug face such that a pilot shaft portion of the guide pin extends from the lug face;
   (d) telescopically sliding the pilot shaft portion into an alignment bore in the chip retention housing that is normal to a face of the cutting head;
   (e) sliding the cutting head into engagement with the lug face to cut chips from the lug face; and
   (f) catching chips cut off the lug face by the cutting head in a chip retention area of the chip retention housing.

14. The method of claim 13 wherein step (c) is further defined by threading the lug attachment portion into the cable bolt attachment hole.

15. The method of claim 13 wherein step (b) is further defined by mounting the cutting head assembly on a rotary shaft attachment, extending the rotary shaft attachment through a bushing opening in the chip retention housing, and connecting a tool attachment portion of the rotary shaft attachment to the source of rotary power.

16. The method of claim 15 wherein step (d) is further defined by the alignment bore extending axially into a telescoping portion of the rotary shaft attachment.

* * * * *